United States Patent [19]

Bassett et al.

[11] 4,421,268

[45] Dec. 20, 1983

[54] INTEGRATED CONTROL SYSTEM USING A MICROPROCESSOR

[75] Inventors: William W. Bassett, Wayzata; Dean R. Rask, Minneapolis, both of Minn.

[73] Assignee: Honeywell Inc., Minneapolis, Minn.

[21] Appl. No.: 197,842

[22] Filed: Oct. 17, 1980

[51] Int. Cl.[3] .................... F23N 3/00

[52] U.S. Cl. .................... 236/10; 236/91 F; 431/20

[58] Field of Search .................... 236/91 F, 9, 10, 91 G, 236/21 R, 91 A; 431/16, 20, 78

[56] References Cited

U.S. PATENT DOCUMENTS 2,188,865 1/1940 Maynard .................... 431/20

2,616,491 11/1952 Nycum .................... 431/20 X

*Primary Examiner*—William E. Wayner

*Attorney, Agent, or Firm*—Clyde C. Blinn

[57] ABSTRACT

An integrated control system for a temperature conditioning apparatus which contains a microprocessor which is connected to the various components of a control system of the temperature conditioning apparatus such as the space thermostat, the fuel valve, the fuel igniter and ignition proving apparatus, the stack temperature sensor, the ambient or vestibule temperature sensor, the plenum temperature sensor, the induced draft blower motor, the refrigeration compressor, and the air circulating fan or blower. With the microprocessor, which has the capability of fast and many types of operations, the interaction of parameters of the temperature conditioning apparatus and operation of the various components of the system can be controlled in an improved manner to add to the overall efficiency of such a temperature conditioning apparatus.

9 Claims, 10 Drawing Figures

| | |
|---|---|
| FIG. 2A | FIG. 2C |
| FIG. 2B | FIG. 2D |

INTEGRATED CONTROL SYSTEM USING A MICROPROCESSOR

BACKGROUND OF THE INVENTION

Even though prior art heating and cooling apparatus had fuel valve controls, plenum air temperature sensors, air circulating fans, induced draft blowers for the exhaust gases of a furnace, ignition and flame sensor apparatus for proving that the ignition of the fuel in the burner takes place, and many other parameter sensors, all of which were a part of a control system for a furnace or air conditioning compressor supplying heated or cooled air to a space in which a thermostat was contained, there has been a continual need for improvement in such control systems. With the advent of increased energy costs, an even greater demand has been shown for more efficient heating and cooling apparatuses and systems, especially for homes and dwellings wherein an individual furnace and air conditioning supplies the heated or cooled air to the home as required by a space thermostat.

Coincidental with the increased cost of energy, the advent of low cost microprocessors has made it possible for the gathering of parameter data and the control of various components of a control system in many new manners which provide the long-awaited increased efficiency and thus cost saving in the operation of a furnance and air conditioning apparatus.

SUMMARY OF THE PRESENT INVENTION

The present invention is concerned with a temperature control system for a temperature conditioning apparatus or furnace delivering temperature conditioned air to a space. An exhaust stack temperature responsive means and an ambient or vestibule temperature responsive means is used to respond to the operating temperature of the exhaust gases and to compare the exhaust gas temperatures to the ambient temperature. When the difference between the exhaust gas temperature and the ambient temperature changes by a predetermined amount from a normal operating differential, certain abnormal conditions are known to exist in the apparatus.

Specifically, the exhaust gas temperature is a predetermined number of degrees above the vestibule temperature during an operating period, and if a clogged exhaust stack develops and the flow of exhaust gases slows down, the exhaust stack temperature will decrease with respect to the vestibule temperature and the fact that the exhaust gas flow through the exhaust stack is restricted can be indicated.

BRIEF DESCRIPTION OF THE DRAWINGS

The invention is shown in the enclosed drawings of which.

DESCRIPTION OF THE PREFERRED EMBODIMENT OF THE INVENTION

Figures 1, 3:
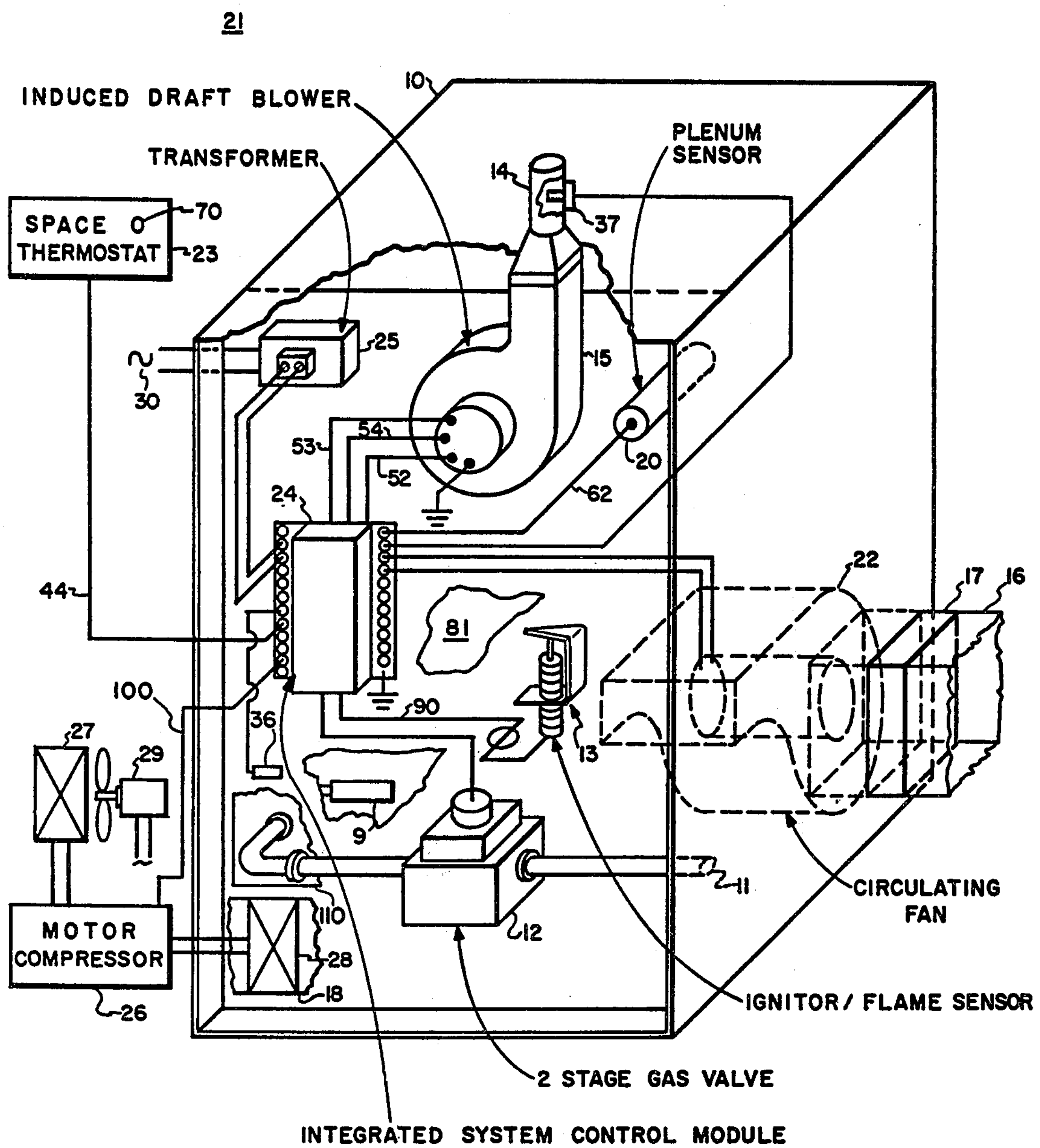
FIG. 1 is a schematic showing of a conventional forced air heating and cooling system.
FIG. 3 is to show the composite of FIGS. 2A to 2D.

Referring to FIG. 1, a conventional temperature conditioning apparatus boiler or furnace 10 is shown.

The furnace burner 9 receives fuel from a gas source connected to pipe 11 and is controlled by a gas valve 12. A secondary air opening 110 supplies air to combustion chamber 81. Gas valve 12 may be of several types such as the VR854 for two stage direct spark control and the VR852 for two stage intermittent pilot control, both made and sold by Honeywell Inc. and shown in brochure 60-2447-2 of May 1980. The gas is ignited and a flame is sensed by a conventional igniter and flame sensor 13 such as the Q354 made by Honeywell Inc. and shown in brochure 60-2053-8 of July 1980. The exhaust gases from the furnace are forced out of an exhaust gas stack or chimney 14 by a power blower 15 such as a blower in the stack to provide an induced draft blower (IDB) furnace. Blower 15 is driven by a conventional shaded pole 120 volt A.C. motor having a Hall effect sensor mounted on the motor shaft to provide a pulse each revolution for a speed sensor and control circuit.

The temperature in the bonnet or plenum is sensed by a temperature responsive element 20 such as a C800 Platinum resinate sensor made and sold by Honeywell Inc. and shown in brochure 60-2484 of November 1979. Temperature conditioned medium or air is circulated through the plenum from a return duct 16 through a filter 17 to the space 21 through a supply duct 18 in a conventional manner by a circulator for a hydronic system or blower 22. The temperature responsive element or thermostat 23 such as a T87F thermostat made by Honeywell Inc. is located in the space connected to controls for the furnace. Thermostat 23 has an indicator light 70 to indicate certain system operating conditions to be mentioned. A conventional refrigeration compressor or heat pump 26 has an outdoor heat exchanger or coil 27 and an indoor heat exchanger or coil 28 which is mounted in supply duct 18. A fan driven by motor 29 removes heat from coil 27. Coil 28 is in the furnace plenum to deliver cool air during the air conditioning operation. Temperature sensors 36 and 37 (of the C800 type) are mounted in the vestibule of the furnace and exhaust gas stack, respectively. Sensor 36 responds to the vestibule or ambient air temperature in the proximity of the secondary air opening 110. Sensor 37 responds to the temperature of the exhaust gas or stack temperature of the induced draft blower furnace. An integrated system control module 24 which is supplied with power from a transformer 25 connected to a source of power 30, has all of the mentioned apparatus connected thereto for controlling the furnace and compressor.

Figure 2A:
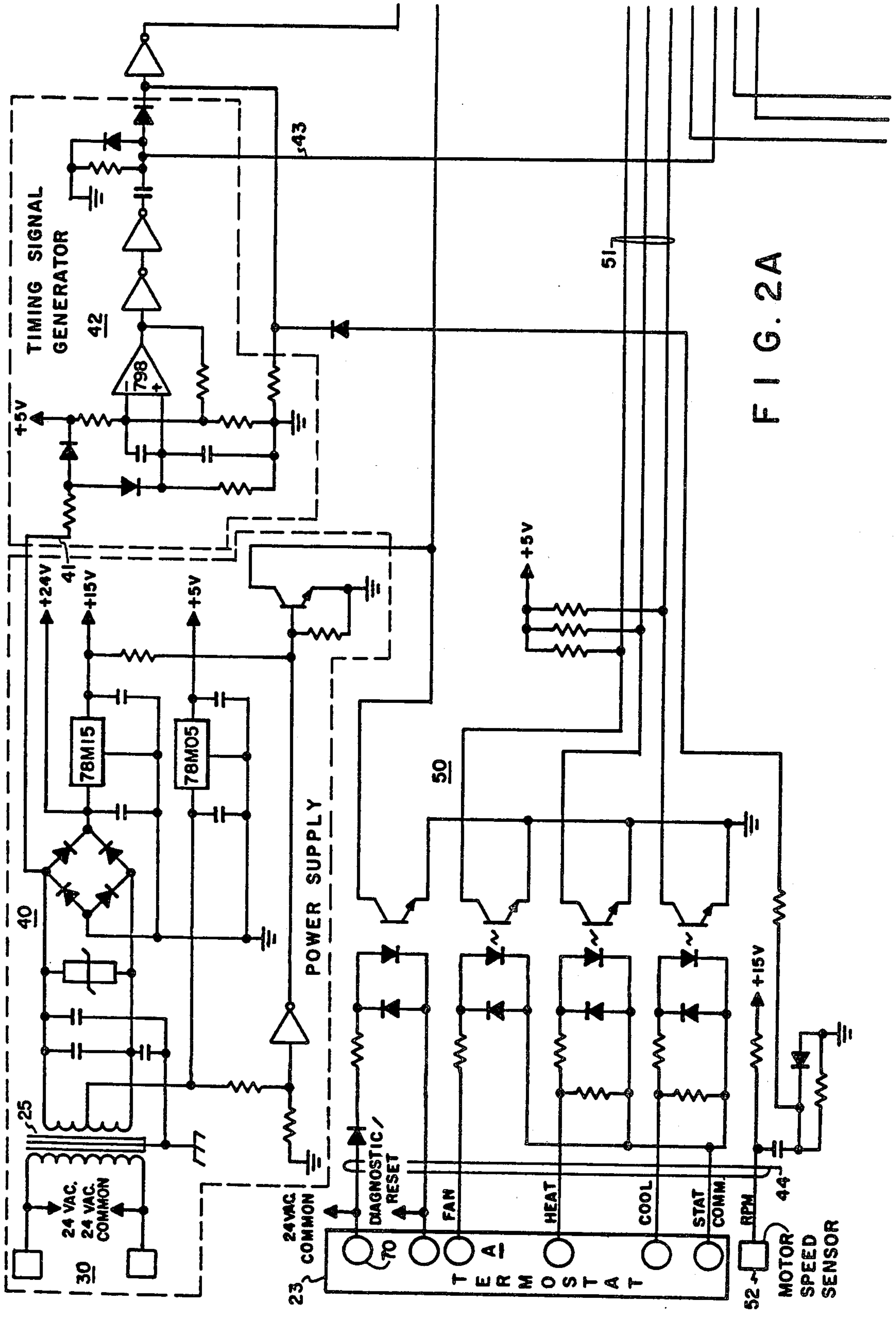
FIGS. 2A to 2D (four) disclose the circuit diagram of a control module connecting the various components of the system to a microprocessor to provide the integrated control system.

Referring to FIG. 2, which is made up of a composite of FIGS. 2A to 2D, the schematic circuit of the integrated system control module 24 is shown in more detail. In FIG. 2A, transformer 25, which is connected to the power source 30, supplies power to a conventional power supply 40 which has one output 41 connected to a timing signal generator 42, which provides a 60 Hz signal available over conductor 43. A thermostat 23 is connected over the six wire conductor 44 to the module 24.

The module 24 has a microprocessor 45 of a conventional type known as the 8049 microprocessor which is made and sold by several different companies such as Intel, National Semi Conductor, and Nippon Electric Company. The microprocessor which is shown in FIGS. 2C and 2D is programmed by one skilled in the art to perform the described operation. The microprocessor receives the signal from the timing signal generator 42 over conductor 43 at pin P14. Similarly, the output of the thermostat 23 is connected through switching circuit 50 over the input conductors 51 to the microprocessor at pin P10, P11 and P12. Indication light 70 is connected to a diagnostic output of the microprocessor at 4.

The induced draft blower 15 has two connections to the control module 24. A first connection 52 is from the motor speed sensor in the blower which comprises a conventional Hall effect transducer for providing a pulse on each revolution of the motor shaft and thus providing a revolution per minute signal or input 52. Two other connections 53 and 54 which are shown in FIG. 2C connect motor speed control 55 of the control module to the induced draft blower motor. The motor speed control receives a signal over the conductor 60 from pin P26 of microprocessor 45.

Figure 2B:
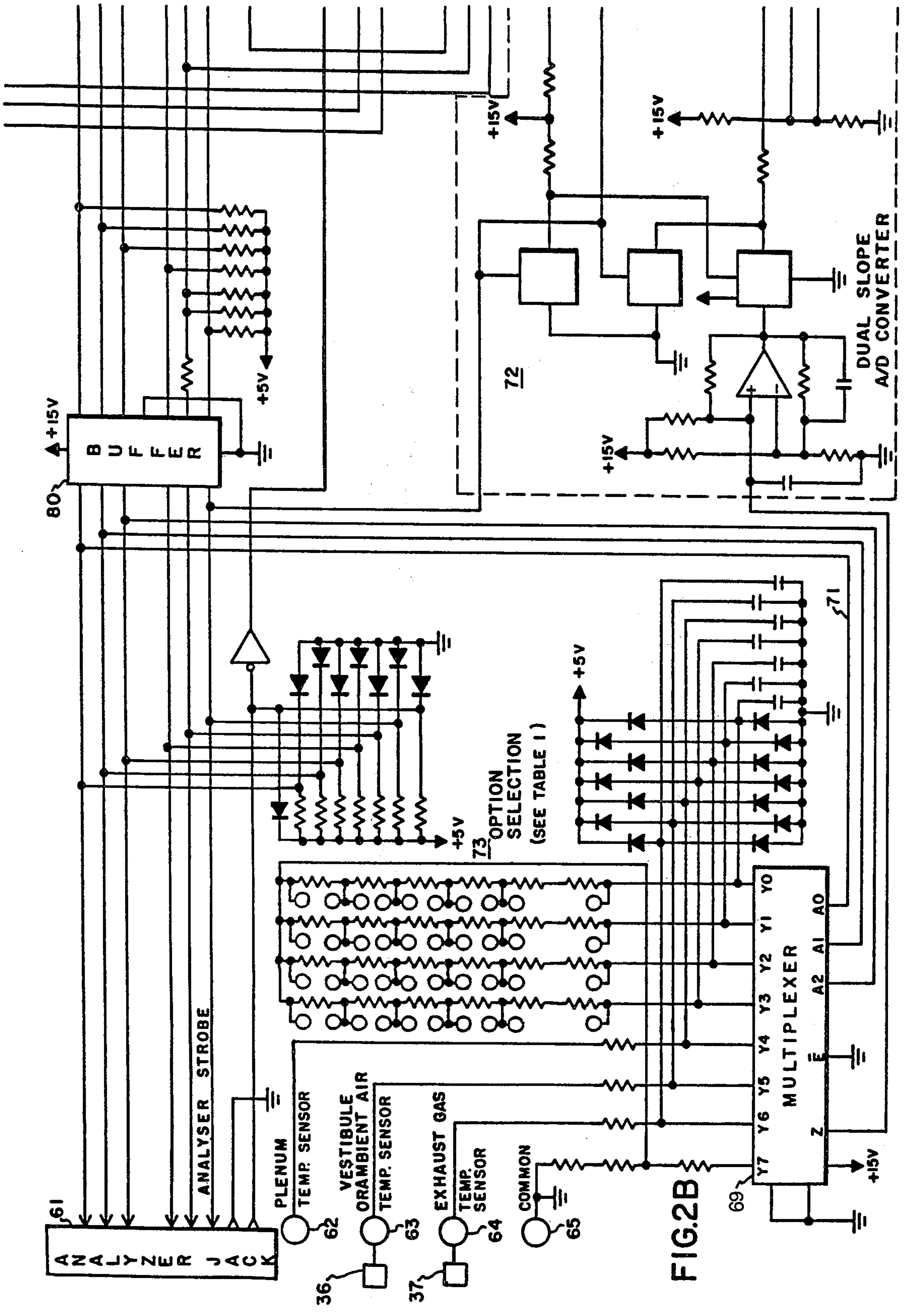
Figure 2C:
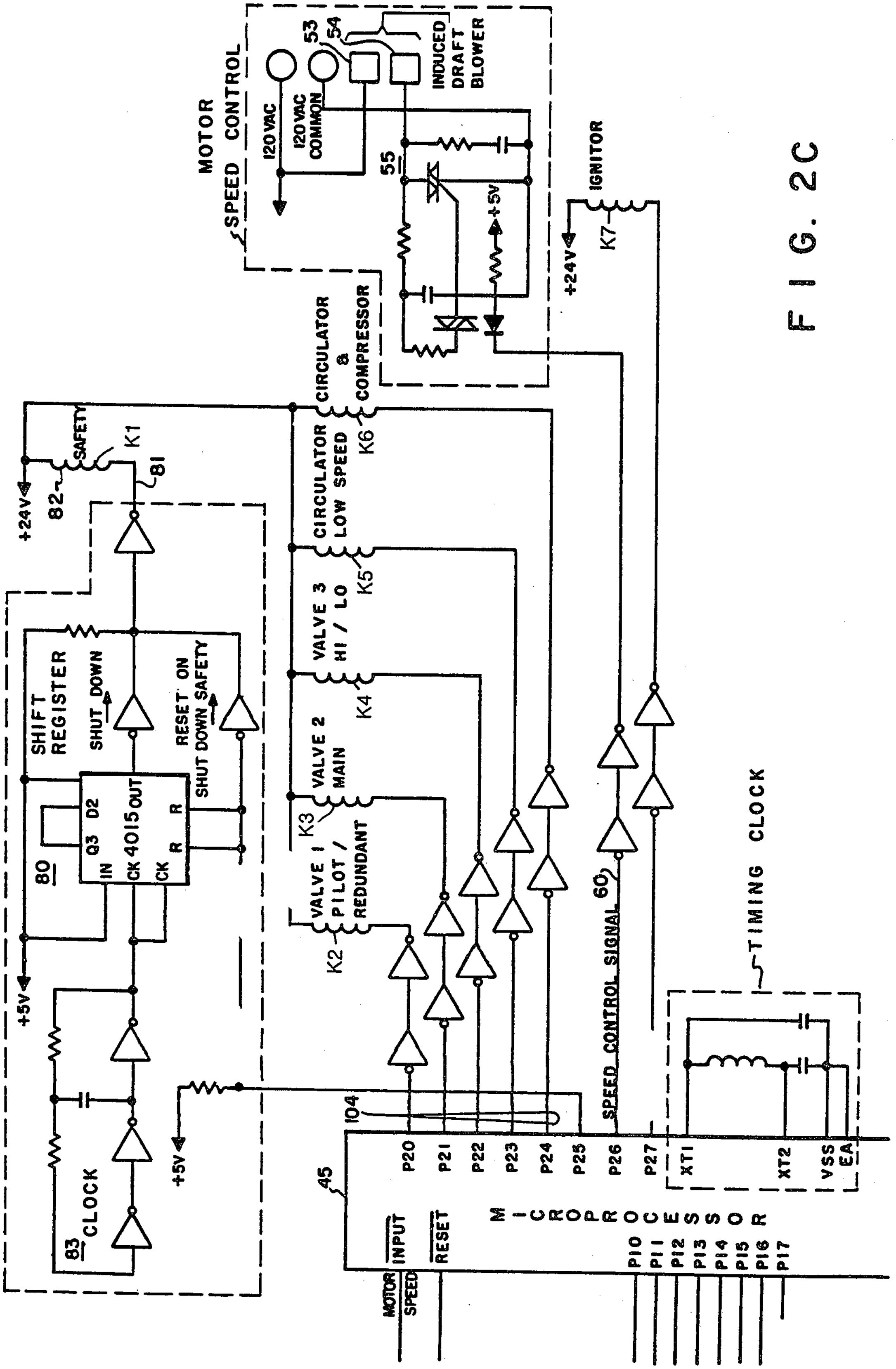
Figure 2D:
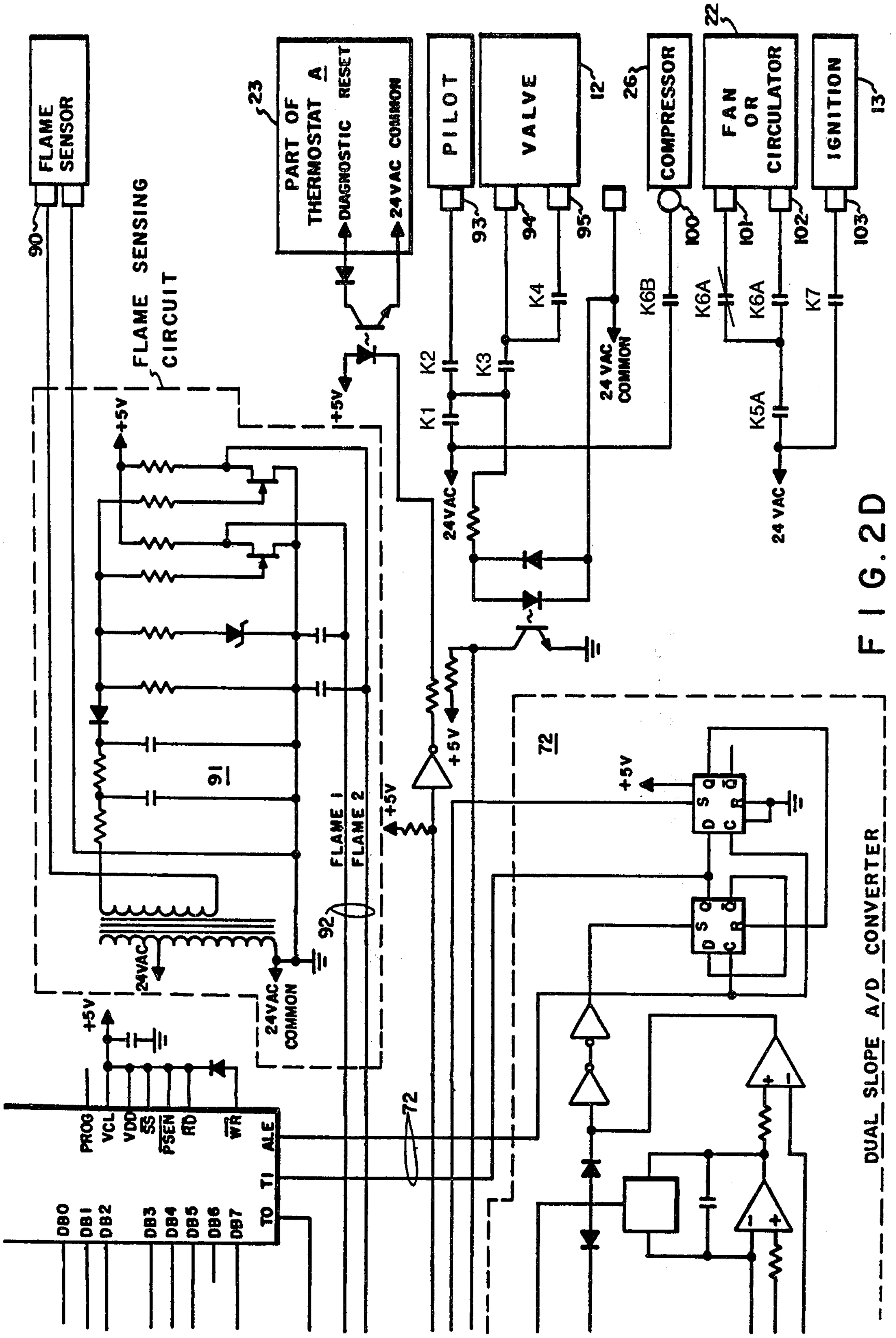

An input is provided at 61 in FIG. 2B for a conventional analyzer which would be connected over a buffer 62 to the microprocessor for analyzing the operation of the system. Input circuit 62 is connected to plenum temperature responsive element or sensor 20. Input 63 connects a temperature responsive element or sensor 36 which senses the ambient or vestibule temperature of the furnace to control 24. Input 64 connects temperature responsive element or sensor 37 in the exhaust gas stack 14 to control 24. Connection 65 is a common ground connection for many of the input circuits.

These sensors, that is the plenum sensor 20, air conditioning discharge coil temperature sensor 36, air conditioning indoor coil temperature sensor 37, are all connected to a conventional CMOS 4051 multiplexer 69 which provides an output over conductor 71 to a conventional analog to digital dual slope converter 72 providing the input to terminals T1 and ALE of the microprocessor over conductors 72 of FIG. 2D.

An optional selection circuit 73 is shown on FIG. 2B which provide for different arrangements of the circuit to the multiplexer in accordance with a selection table I as Appendix I. The optional selection can be accomplished by making different circuit connections either by breaking jumpers or using conventional pins to make selected connections.

Referring to FIG. 2C, a shift register 80 has an output at 81 connected to a safety switch relay 82 and K1. Referring to FIG. 2D, input 90 provides the connection from the flame igniter and flame sensor 13 and is connected to the flame sensor circuit 91 of the type S825C made and sold by Honeywell Inc. and shown in brochure 60-2053-8 of July 1980, for providing a redundant signal over conductors 92 to the pins P13 and P15 of the microprocessor. Inputs 93, 94 and 95 are connected to the gas valve 12 and provide for a control of the pilot main valve and high fire valve when two stage burner operation is used. Output 100 is connected to the motor compressor. Output 101 and 102 are connected to a circulator for a hydronic system or circulation fan 22, and output 103 is connected to the igniter 13 when direct ignition is used. The output of the microprocessor from conductors 104 are connected to control a plurality of relays K2, K3, K4, K5 and K6, which have associated contacts with similar labels for controlling the various components connected to output circuits 94, 95, 100, 101, 102 and 103.

OPERATION OF THE PREFERRED EMBODIMENT OF THE INVENTION

Referring to FIG. 1, the furnace 10 has the induced draft blower 15 in the exhaust stack 14. Upon a call for heat by the space thermostat 23, the induced draft blower 15, valve 12, and ignition apparatus 13, are operated to bring about the ignition of the fuel at burner 9 and thus the operation of the furnace. During normal operation of the furnace, air that is drawn into the combustion chamber 81 generally passes through the vestibule of the furnace in which temperature responsive element 36 is mounted to respond to the vestibule air temperature which is generally the ambient air temperature surrounding the furnace. As the furnace operates and the exhaust gases passing through the exhaust stack 14 increase in temperature, the temperature of the temperature responsive element 37 increases and a predetermined temperature differential exists between the temperature of element 37 and the ambient air temperature or element 36 for normal operating periods.

Upon the existence of an abnormal condition to block the air flow of stack 14, such would be a condition as a normal foreign object in the stack or ice developing in the stack, the flow of exhaust gases out of the stack decreases. The temperature of temperature responsive element 37 decreases and the lowering of the differential between the temperature of sensor 37 and the ambient temperature at 36 provides a signal through control module 24 to show that an abnormal condition existed. Either the operation of the furnace is stopped by control 24 or an indication of such abnormal condition is indicated at indicator 70 on the space thermostat 23.

After some predetermined time of normal operation of the furnace, the differential temperature between the exhaust gas temperature and ambient temperature or vestibule temperature whichever two sensors are used for control shall not be less than a first predetermined value. The first predetermined value is a preprogrammed value stored in a memory of the microprocessor 45. Upon an abnormal flow of exhaust gases in stack 14, the differential temperature will either fall below or not reach the first predetermined value. Upon the differential temperature falling below or not reaching the first predetermined temperature, the microprocessor recognizes an unsafe condition and the system is modified or shut down.

TABLE I

| | SELECTABLE OPTIONS | |
|---|---|---|
| DESCRIPTION | NUMBER OF CHOICES | REMARKS |
| SAFETY LIMIT | 5 | −185, 200, 215, 230, 245° F.<br>(TO BE FIELD SELECTABLE)<br>DIFFERENTIAL −15° F. ± 5° F.<br>CALIBRATION ACCURACY - ± 8° F. |
| IGNITION TYPE | 2 | DSI OR I.P. |
| FLAME ESTABLISHMENT PERIOD | | |
| DSI. MAIN BURNER | 5 | 4, 6, 11, 21, 60 SEC |
| I.P. - PILOT | 2 | 15 & 90 SEC |
| PRE-PURGE | 2 | 0 & 25 SEC FOR GAS |
| | 3 | (0, 25 & 45 SEC FOR OIL) |

TABLE I-continued

| DESCRIPTION | SELECTABLE OPTIONS NUMBER OF CHOICES | REMARKS |
|---|---|---|
| POST PURGE | 1 | 0 SEC FOR GAS |
| | 2 | (0 & 20 SEC FOR OIL) |
| VALVE | 2 | SINGLE OR 2 STAGE |
| DRAFT | 2 | INDUCED OR NATURAL |
| | | (INDUCED DRAFT MANDATORY W/2 STAGE) |
| *SYSTEM TYPE | 2 | HIGH OR LOW MASS |
| *TRIALS FOR IGNITION | 2 | 3 FOR GAS |
| (AUTO RE-CYCLE) | | 1 FOR OIL |

The embodiments of the invention in which an exclusive property or right is claimed are defined as follows:

1. An improvement in a temperature control system for use with a temperature conditioning apparatus having a power blower delivering exhaust gases from a combustion chamber to an exhaust stack, the improvement comprising
   temperature responsive means responsive to the output exhaust gas temperature of the temperature conditioned apparatus,
   first means connected to said temperature responsive means to respond to a decrease in said exhaust gas temperature from a predetermined temperature,
   ambient temperature responsive means adapted to respond to the ambient temperature of the temperature conditioning apparatus, and
   second means connecting said ambient temperature responsive means to said first means whereby said first means responds to a predetermined difference between the temperature of the exhaust gas and ambient temperature.

2. In a temperature control system for a temperature changing apparatus deivering temperature conditioned air to a space, the apparatus being connected to an exhaust gas stack, comprising
   space temperature responsive means adapted to respond to the temperature in the space,
   control means adapted to control the temperature conditioning apparatus,
   first means connecting said space temperature responsive means to said control means to maintain a predetermined temperature in the space,
   exhaust gas temperature responsive means adapted to respond to the output exhaust gas temperature of the exhaust gas,
   means connecting said control means to said exhaust gas temperature responsive means,
   ambient temperature responsive means adapted to respond to the ambient temperature of the temperature conditioning apparatus, and
   second means connecting said ambient temperature responsive means to said control means to be responsive to an output of said ambient temperature responsive means whereby said control means is effected by an abnormal operation of the temperature conditioning apparatus.

3. The invention of claim 2 wherein the temperature conditioning apparatus is a furnace.

4. The invention of claim 2 wherein
   the differential temperature between said exhaust gas temperature responsive means and said ambient temperature responsive means and said ambient temperature responsive means is compared with a preprogrammed differential temperature stored in said control means and said control means is adapted to modify the operation of the temperature conditioning apparatus when said differential temperature deviates from said stored differential temperature by a predetermined amount.

5. The invention of claim 4 wherein said control means is a microprocessor.

6. An improvement in a temperature control system for use with a temperature conditioning apparatus having a power blower delivering exhaust gases from a combustion chamber to an exhaust stack, the improvement comprising
   temperature responsive means responsive to the output exhaust gas temperature of the temperature conditioned apparatus,
   first means connected to said temperature responsive means to respond to a decrease in said exhaust gas temperature from a predetermined temperature,
   vestibule temperature responsive means adapted to respond to the vestibule temperature of the temperature conditioning apparatus, and
   second means connecting said vestibule temperature responsive means to said first means whereby said first means responds to a predetermined difference between the temperature of the exhaust gas and vestibule temperature.

7. The invention of claim 6 wherein
   the differential temperature between said exhaust gas temperature responsive means and said vestibule temperature responsive means is compared with a preprogrammed differential temperature value stored in said control means whereby said control means is adapted to change the operation of the temperature conditioning apparatus.

8. The invention of claim 7 wherein said control means comprises a microprocessor.

9. In a temperature control system for a temperature changing apparatus delivering temperature conditioned air to a space, the apparatus being connected to an exhaust gas stack, comprising
   space temperature responsive means adapted to respond to the temperature in the space,
   control means adapted to control the temperature conditioning apparatus,
   first means connecting said space temperature responsive means to said control means to maintain a predetermined temperature in the space,
   exhaust gas temperature responsive means adapted to respond to the output exhaust gas temperature of the exhaust gas,
   means connecting said control means to said exhaust gas temperature responsive means,
   vestibule temperature responsive means adapted to respond to the vestibule temperature of the temperature conditioning apparatus, and
   second means connecting said vestibule temperature responsive means to said control means.

* * * * *